US008270834B2

(12) United States Patent
West, Jr.

(10) Patent No.: US 8,270,834 B2
(45) Date of Patent: Sep. 18, 2012

(54) FREQUENCY MODULATED BURST MODE OPTICAL SYSTEM

(76) Inventor: Lamar E. West, Jr., Maysville, GA (US)

( * ) Notice: Subject to any disclaimer, the term of this patent is extended or adjusted under 35 U.S.C. 154(b) by 940 days.

(21) Appl. No.: 11/762,397

(22) Filed: Jun. 13, 2007

(65) Prior Publication Data
US 2008/0310849 A1 Dec. 18, 2008

(51) Int. Cl.
*H04B 10/00* (2006.01)
(52) U.S. Cl. .......................................................... 398/76
(58) Field of Classification Search .................. 725/129;
398/67–76
See application file for complete search history.

(56) References Cited

U.S. PATENT DOCUMENTS

| | | | | |
|---|---|---|---|---|
| 3,886,454 | A * | 5/1975 | Oakley et al. ................. | 725/125 |
| 4,920,533 | A * | 4/1990 | Dufresne et al. ............. | 370/445 |
| 5,005,936 | A * | 4/1991 | Hsu .................................... | 398/76 |
| 5,212,579 | A * | 5/1993 | Huber et al. .................... | 398/76 |
| 5,227,908 | A * | 7/1993 | Henmi .......................... | 398/192 |
| 5,488,413 | A * | 1/1996 | Elder et al. .................... | 725/106 |
| 5,519,530 | A * | 5/1996 | Utsumi ......................... | 359/264 |
| 5,592,540 | A * | 1/1997 | Beveridge ..................... | 379/184 |
| 5,724,170 | A * | 3/1998 | Aizawa ......................... | 398/197 |
| 5,765,097 | A * | 6/1998 | Dail .............................. | 725/125 |
| 5,850,218 | A * | 12/1998 | LaJoie et al. .................... | 725/45 |
| 5,864,672 | A * | 1/1999 | Bodeep et al. ................. | 725/126 |
| 5,893,024 | A * | 4/1999 | Sanders et al. ................ | 725/125 |
| 5,963,844 | A * | 10/1999 | Dail .............................. | 725/125 |
| 6,041,056 | A * | 3/2000 | Bigham et al. ........... | 370/395.64 |
| 6,067,177 | A * | 5/2000 | Kanazawa ........................ | 398/1 |
| 6,137,607 | A * | 10/2000 | Feldman et al. ............ | 398/167.5 |
| 6,256,329 | B1 * | 7/2001 | Ishizuka et al. ............. | 372/38.02 |
| 6,282,216 | B1 * | 8/2001 | Ikeuchi et al. ............. | 372/29.015 |
| 6,418,558 | B1 * | 7/2002 | Roberts et al. ................ | 725/129 |
| 6,462,851 | B1 * | 10/2002 | West, Jr. ........................ | 398/141 |
| 6,493,335 | B1 * | 12/2002 | Darcie et al. ................. | 370/344 |
| 6,509,994 | B2 * | 1/2003 | West, Jr. ........................ | 398/192 |
| 6,748,173 | B2 * | 6/2004 | Ishii et al. ........................ | 398/79 |

(Continued)

FOREIGN PATENT DOCUMENTS

JP 362066745 3/1987

(Continued)

OTHER PUBLICATIONS

U.S. Appl. No. 09/840,767, filed Apr. 23, 2001, entitled "Burst-Mode Digital Transmitter," Inventors: J. Graham Mobley, et al.

(Continued)

*Primary Examiner* — Danny Leung
(74) *Attorney, Agent, or Firm* — Tarolli, Sundheim, Covell & Tummino LLP

(57) ABSTRACT

The present invention is directed towards a frequency modulated (FM) burst mode optical system that allows optical signals having a common wavelength provided by a plurality of FM burst mode optical transmitters to be passively combined onto a single optical fiber. A single FM optical receiver receives the combined signals and processes them accordingly. Each FM burst mode optical transmitter includes an FM modulator, a carrier detect circuit and a laser. The FM modulator modulates a carrier signal, such as a 1.21 GHz signal, with received reverse electrical signals. When a sub-carrier signal is detected by the carrier detect circuit, the laser is turned and the frequency modulated carrier signal is used to intensity modulate a laser to provide an optical signal. Due to the burst-mode transmission of optical signals, the optical signals can be passively combined and transmitted to a single optical receiver.

17 Claims, 7 Drawing Sheets

U.S. PATENT DOCUMENTS

| | | | |
|---|---|---|---|
| 7,076,170 B2 * | 7/2006 | Choa | 398/115 |
| RE39,785 E * | 8/2007 | Fuse | 398/79 |
| 7,505,692 B2 * | 3/2009 | Best | 398/182 |
| 7,614,074 B2 * | 11/2009 | Mobley et al. | 725/129 |
| 2002/0075919 A1 * | 6/2002 | Tochio | 372/38.02 |
| 2002/0154371 A1 | 10/2002 | West | |
| 2003/0007220 A1 * | 1/2003 | Whittlesey et al. | 359/167 |
| 2003/0121056 A1 * | 6/2003 | Sorenson et al. | 725/125 |
| 2004/0028122 A1 * | 2/2004 | Kien et al. | 375/216 |
| 2007/0189772 A1 * | 8/2007 | Hyun et al. | 398/71 |
| 2008/0310846 A1 * | 12/2008 | West et al. | 398/115 |
| 2008/0310849 A1 * | 12/2008 | West, Jr. | 398/116 |

FOREIGN PATENT DOCUMENTS

| | | |
|---|---|---|
| JP | 20020044030 | 2/2002 |
| WO | WO 03/005611 A | 1/2003 |
| WO | WO 2004/014010 A | 2/2004 |
| WO | WO 2005/112309 A | 11/2005 |

OTHER PUBLICATIONS

U.S. Appl. No. 11/683,640, filed Mar. 8, 2007, entitled "Reverse Path Optical Link Using Frequency Modulation," Inventor: Lamar E. West, Jr.

U.S. Appl. No. 11/762,291, filed Jun. 13, 2007, entitled "Frequency Modulated Burst Mode Transmitter," Inventor: Lamar E. West, Jr., et al.

PCT International Search Report for International Application No. PCT/US2008/056115—dated Jul. 30, 2008, Applicant: Scientific-Atlanta, Inc.—(4 pgs.).

Juin-Hung Chen et al., "FM Subcarrier Fiber Optical Transmission System Design and its Application in Next-Generation Wireless Access", Journal of Lightwave Technology, IEEE Service Center, New York, NY, US, vol. 16, No. 7, Jul. 1, 1998, pp. 1137-1148.

Kikushima Koji et al., "Simultaneous Optical Transmission of Optical Transmission of AM-VSB/64-QAM/FM/TC8PSK/QPSK Multi-channel Television Signals by Super-wideband FM and BS/CS-RF Conversion Techniques", IEICE Trans Communications, vol. E89-B, No. 11, Nov. 2006, pp. 3008-3020.

Tomoaki Ohira, Kouichi Masuda, Masaru Fuse, "Study of Super-Wideband FM Technique Using Optical Homodyne-Detection Scheme", ECOC 2005 Proceedings, vol. 4, Sep. 2005, pp. 921-922.

Shibutani Makoto et al., Database Compandex from EPO Search Report, "Multichannel VSB-AM Transmission System Using Super-Wideband Frequency Modulator and Demodulator ICs", Conf. Opt Fiber Commun Tech Dig. Ser; Conference on Optical Fiber Communication, Technical Digest Series 1997 IEEE, Piscataway, NJ, USA, (Month Unknown) 1997, 1 page.

EPO Examination Search Report, 5 pgs., Apr. 21, 2010, Scientific-Atlanta, Inc.

* cited by examiner

FREQUENCY MODULATED BURST MODE OPTICAL SYSTEM

TECHNICAL FIELD

The present invention is generally related to a communications system and, more particularly, is related to systems and methods for transmitting combined reverse optical signals from a plurality of frequency modulated burst mode transmitters.

BACKGROUND OF THE INVENTION

Hybrid fiber/coaxial (HFC) communications systems transmit signals in a forward and reverse path between a headend and a plurality of subscribers. In the reverse path, a coaxial cable feeder portion connects the subscriber equipment (e.g., cable modems, digital set-top boxes) with an optical node, which conventionally converts the radio frequency (RF) signals received from the subscriber equipment to optical signals, that sits at the input of an optical link. Subsequently, the optical link connects the reverse path from the optical node to a hub or headend where the optical signals are processed accordingly.

Lasers used for reverse path signaling in the conventional approach to HFC network design are intensity modulated by amplitude modulated radio frequency (RF) electrical signals that contain information for transmission in the reverse path. Ideally the light intensity from these lasers is proportional to the amplitude of the electrical signals. The light is launched down a reverse path optical fiber and is attenuated by an amount that is a function of the length of that fiber. RF output power levels from conventional optical receivers are a function of the received optical input power. Thus the RF output power levels at receivers positioned at the end of very long fibers can be low due to the attenuation of the light over the long fiber distance, and may result in poor signal quality. Variations in the length of optical fibers throughout the HFC network result in variations in the received optical power at the input of each optical receiver. Consequently, RF output power is manually adjusted at each optical receiver to compensate for variations in optical loss from link to link.

Furthermore, due to current limitations, a single optical transmitter is coupled to a single optical receiver via optical fiber. Unlike electrical devices, such as taps and amplifiers, that combine and split electrical signals, optical signals cannot be combined while still preserving the information since the information is carried on a single wavelength. Therefore, conventionally, wave division multiplexers are used to change the wavelengths of each optical transmitter before they are combined, and then at the receiving end, the wavelengths are demultiplexed and changed back to the original single wavelength prior to being received at an optical receiver. Regardless, there still remains a one to one correlation of an optical transmitter to an optical receiver. Therefore, there is a need to address the deficiencies and/or inadequacies of reverse optical systems.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Figure 1:
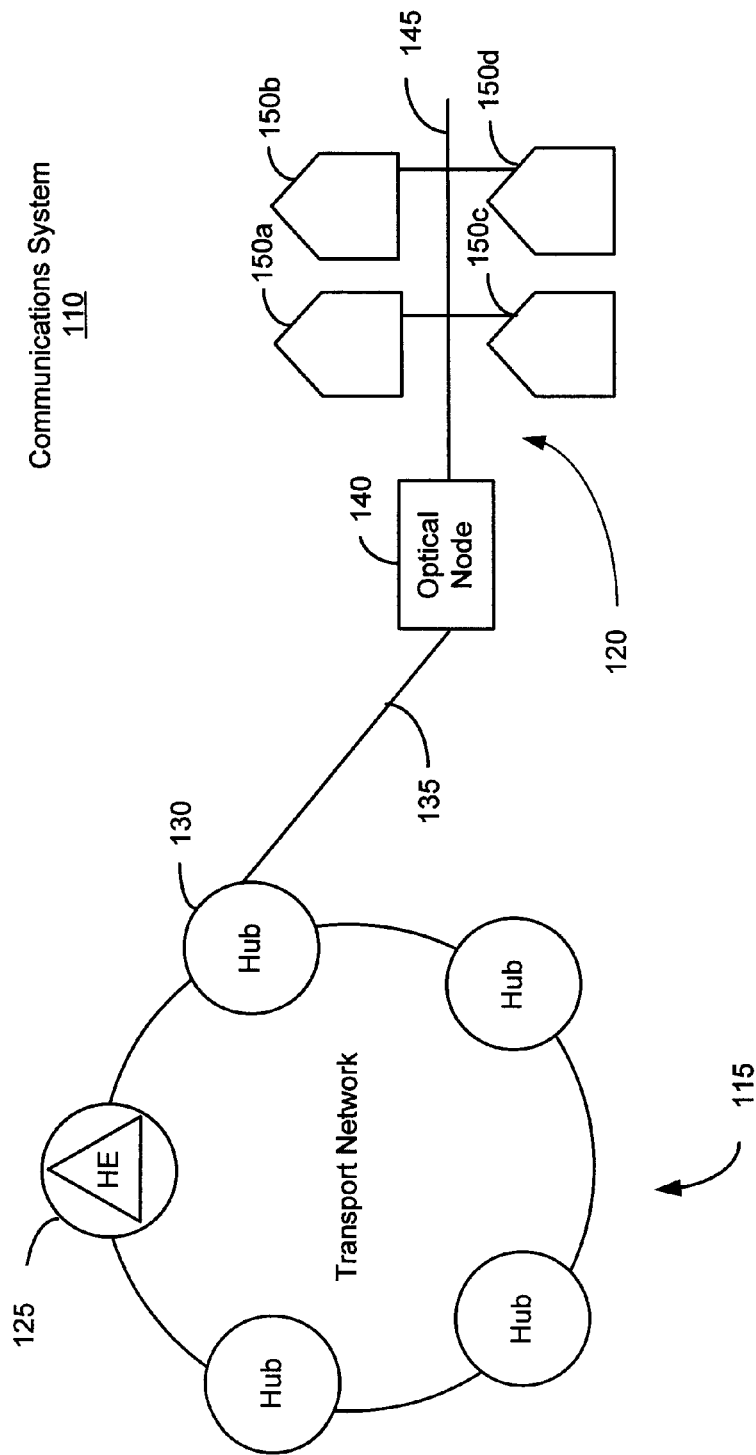
FIG. 1 is an abridged block diagram of a communications system that is suitable for use in implementing the present invention.

The preferred embodiments of the invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. Furthermore, all "examples" given herein are intended to be non-limiting.

The present invention is directed towards a frequency modulated (FM) burst mode optical system. The FM burst mode optical system of the present invention comprises a plurality of FM burst mode optical transmitters that can receive a reverse electrical signal, frequency modulate a carrier signal using the received reverse electrical signal, and intensity modulate a laser with the frequency modulated carrier signal to generate an optical signal only when a reverse electrical signal is present. In the FM burst mode optical system of the present invention, the optical signals generated by a plurality of FM burst mode optical transmitters can be combined and transmitted to a single FM optical receiver. By using frequency modulation to transport information, rather than amplitude modulation, longer optical fibers can be used without inducing the high attenuation losses that plague amplitude modulated signals. By operating in a burst mode fashion, where the laser transmits only when a reverse electrical signal is present, optical signals from a plurality of FM burst mode optical transmitters can be combined so that a system of the present invention need not provide an FM optical receiver for each FM burst mode optical transmitter. Thus the system of the present invention expands system capacity while conserving system resources.

It is noted that the reverse electrical signals described herein contain desired information transmitted on a carrier frequency. To distinguish between the carrier signals of the reverse electrical signals and the carrier signal that is frequency modulated by the invention, the frequency bands of the reverse electrical signals are referred to as subcarrier frequencies, and they are typically in the MHz range. The carrier signal that is frequency modulated by the FM burst mode optical transmitter of the invention is referred to as the carrier signal, and, in an exemplary embodiment, is in the GHz range. The FM burst mode optical transmitter of the invention includes a carrier detect circuit that detects the presence of a subcarrier signal and turns the laser on only when a subcarrier signal is present, indicating the presence of a desired reverse electrical signal. Thus the carrier detect circuit enables burst mode operation of the FM burst mode optical transmitter of the invention.

In an exemplary embodiment of a system of the invention, the FM burst mode optical transmitters receive reverse electrical signals at RF subcarrier frequencies that are typically within the frequency range of 5 MHz to 45 MHz. However received reverse electrical signals can also be transmitted at subcarrier frequencies in the ranges of 5 MHz to 108 MHz, 5 MHz to 174 MHz, or 5 MHz to 88 MHz, depending upon the application. Each FM burst mode optical transmitter of the present invention uses the received reverse electrical signals to frequency modulate an RF carrier signal. In an exemplary embodiment, the FM burst mode optical transmitter uses the received reverse electrical signals to frequency modulate a 1.21 GHz RF carrier signal. The frequency modulated RF carrier signal is then used to intensity modulate a laser. In this manner, since the optical signal transports the desired information in the frequency domain as opposed to the optical signal amplitude, longer fiber distances can be used, since frequency modulated signals are more robust than amplitude modulated signals. The FM burst mode optical transmitter of the present invention includes a carrier detect circuit that can detect the presence of a reverse electrical signal transmitted at a subcarrier frequency. Conventional optical transmitters typically bias the laser so that the laser continually generates a reverse optical signal regardless of whether a reverse electrical signal at a subcarrier frequency is present. By using the carrier detect circuit of the present invention, the laser can be turned on in the presence of a reverse electrical signal, and turned off in the absence of a reverse electrical signal, thereby conserving resources and allowing the optical signals from a plurality of FM burst mode transmitters to be combined. Accordingly, only when a subcarrier signal is detected does the FM burst mode optical transmitter send an optical signal to an FM optical receiver located further upstream. Notably, since the FM burst mode optical transmitter of the present invention transmits an optical signal only when a reverse subcarrier signal is present, optical outputs from a plurality of FM burst mode optical transmitters can be combined even when the optical outputs have a common wavelength. Thus, a single FM optical receiver can receive a plurality of optical outputs from the plurality of FM burst mode optical transmitters and process them accordingly. Advantageously, since there is no longer a one-to-one correlation of optical transmitter to optical receiver, fewer optical receivers are required in the frequency modulated burst mode optical system of the invention. For example, there may only be one FM optical receiver required in a hub that services several FM burst mode optical transmitters.

FIG. 1 is an abridged block diagram of a communications system 110 that is suitable for use in implementing the present invention. Typically, the communications system 110 includes a transport network 115 and a transmission network 120. The transport network 115, which is fiber optic cable, connects a headend 125 and hubs 130 for generating, preparing, and routing programs and other optical packets over longer distances; whereas the transmission network 120, which is coaxial cable, generally routes electrical packets over shorter distances. Programs and other information packets received, generated, and/or processed by headend equipment can be broadcast to all subscribers in the system 110, or alternatively, can be selectively delivered to one or more subscribers. Fiber optic cable 135 connects the transport network 115 to an optical node(s) 140 which converts optical packets to electrical packets. Thereafter, coaxial cable 145 routes the electrical packets to one or more subscriber premises 150a-d.

In the reverse, or upstream, direction, subscriber premises equipment, such as set-top boxes or cable modems, generate reverse electrical signals. The optical node 140, which includes an optical transmitter, converts the reverse electrical signals into optical signals for further routing to the hubs 130. The hubs 130 then route the optical signals to the headend 125 for further processing. Thus the optical node 140 can receive optical signals from the transport network 115 and convert them to electrical signals, and can also receive electrical signals from the transmission network 120 and convert them to optical signals.

Figure 2:
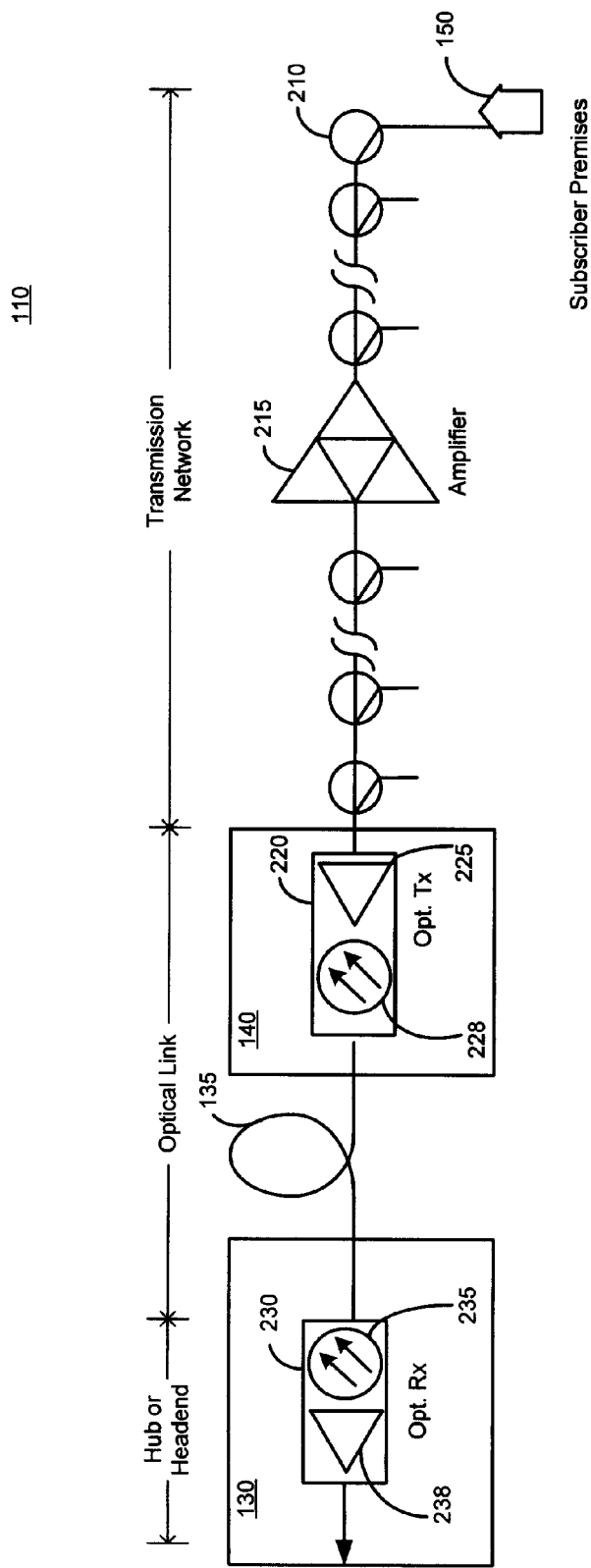
FIG. 2 illustrates one link in the reverse direction of the broadband communications system of FIG. 1.

FIG. 2 illustrates one link in the reverse direction of the prior art broadband communications system 110 of FIG. 1. A tap 210 receives the reverse electrical signals from a subscriber 150 and combines the signals with other reverse electrical signals being transmitted on that path. An amplifier 215 amplifies the combined electrical signals as necessary. At the demarcation point between the transmission network and the optical links is the optical node 140 which includes optical transmitter 220. Reverse electronics 225, such as amplifiers and other configuration modules, prepare the signals for conversion into optical signals by laser 228. The optical signals are then transported across optical fiber 135 to an optical receiver 230, which is included in either the hub 130 as shown in FIG. 2 or the headend 125. The optical receiver 230 converts the optical signals back into electrical signals via a photodiode 235 and reverse electronics 238 further condition the signal as required. The reverse electrical signals, which have been combined from various subscribers 150a-d, as shown in FIG. 1, are then provided to headend equipment 125. As mentioned, however, the optical signals are susceptible to signal attenuation, in the case of analog optical signal transport, or require expensive digital electronics in order to convert the optical signals into a digital optical signal. The present invention, in contrast, transports frequency modulated optical signals where the information of the reverse signals is carried in the frequency domain, so that long fiber can be used without incurring significant signal losses.

Figure 3:
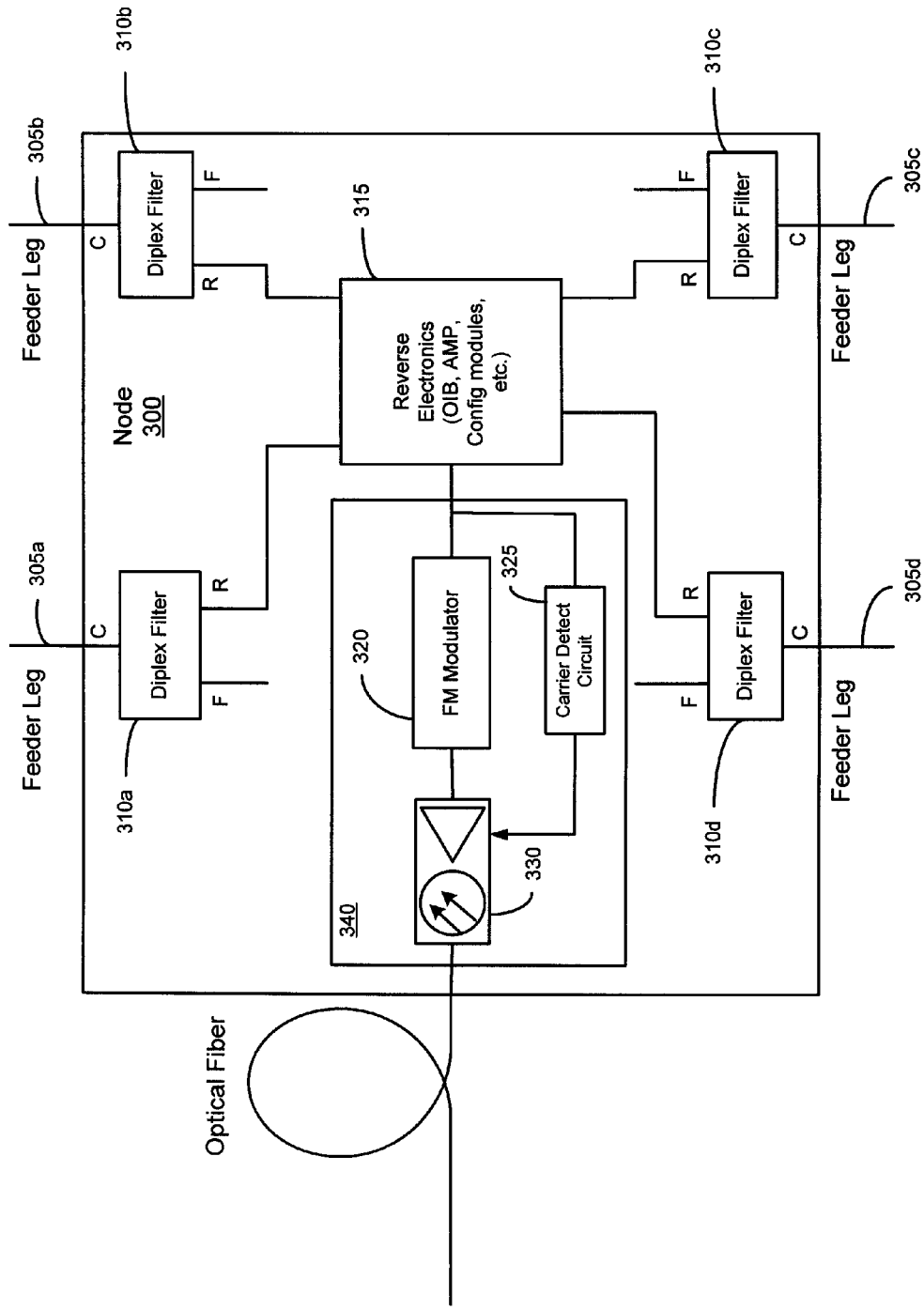
FIG. 3 is a block diagram of a first embodiment of a FM burst mode optical transmitter in accordance with the present invention.

FIG. 3 is a block diagram of an exemplary optical node 300 that includes an exemplary FM burst mode optical transmitter 340 of the present invention. Feeder legs 305a-d receive reverse electrical signals at subcarrier frequency bands from subscribers located on four different paths. Any number of feeder legs can be input to the optical node 300. Diplex filters 310a-d isolate the reverse electrical signals from the forward, or downstream, signals. The reverse electronics module 315 then amplifies, combines, and configures the reverse electrical signals in a known manner. The output of the reverse electronics module 315 is then input to the FM burst mode optical transmitter 340.

The FM burst mode optical transmitter 340 includes an FM modulator 320, a carrier detect circuit 325 and a laser 330. In the exemplary embodiment depicted in FIG. 3, the electrical signals output from the reverse electronics module 315 are input to the FM modulator 320 and the carrier detect circuit 325. The FM modulator 320 uses the reverse electrical signals to modulate an RF carrier signal. In an exemplary embodiment, a 1.21 GHz carrier signal is frequency modulated with the received reverse electrical signals. The frequency modulated carrier signal is then used to intensity modulate the laser 330. The carrier detect circuit 325 detects the presence of any subcarrier signal in the reverse electrical signals. Typically, electrical noise, interference and other undesired electrical signals are also received from the feeder legs 305a-d, regardless of the presence of a subcarrier signal that carries desired reverse information from subscribers. The carrier detect circuit 325 can detect the presence of a subcarrier signal and control the laser 330 accordingly. More specifically, when a subcarrier signal is detected, the carrier detect circuit 325 turns the laser 330 on so that it can be intensity modulated with the frequency modulated carrier signal. When a subcarrier signal is not detected, the laser 330 is turned off, and no optical signals are transmitted further upstream. In a further exemplary embodiment, the carrier detect circuit 325 can control the FM modulator 320 so that the 1.21 GHz carrier signal is frequency modulated with received reverse electrical signals only when a subcarrier signal is detected. Further information regarding frequency modulated optical signals can be found in copending U.S. patent application Ser. No. 11/683,640 entitled "Reverse Path Optical Link using Frequency Modulation," filed on Mar. 8, 2007, the disclosure and teachings of which are hereby incorporated by reference.

Figure 4:
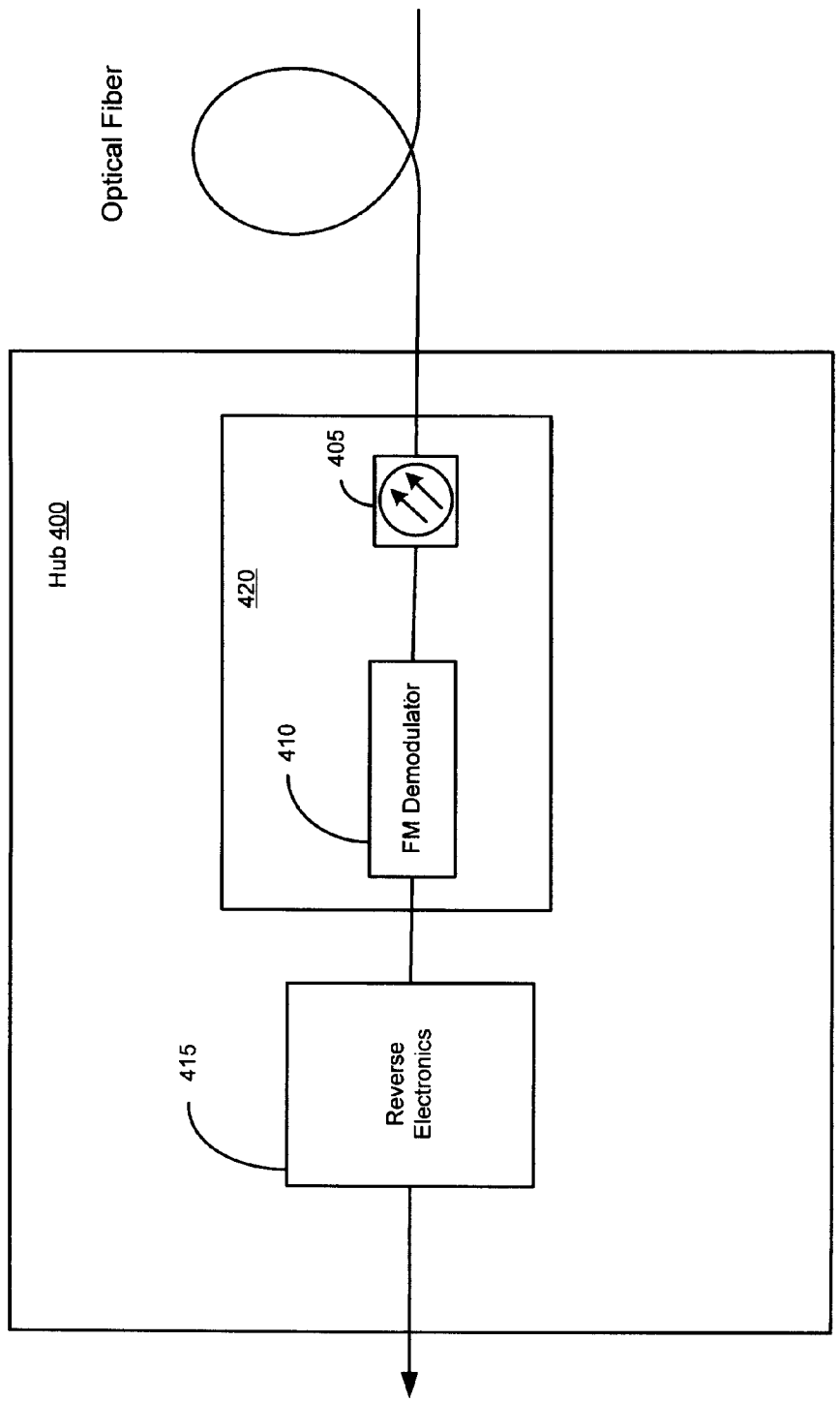
FIG. 4 is a block diagram of a frequency modulated optical receiver that is suitable for use with the frequency modulated burst mode transmitter of FIG. 3.

FIG. 4 is a block diagram of a hub 400 that includes a reverse FM optical receiver 420 that is suitable for use with the FM burst mode transmitter 340 of FIG. 3. The reverse FM optical receiver 420, which is coupled to the FM burst mode optical transmitter 340, receives the optical signal that is transmitted only when reverse signals in a reverse subcarrier frequency band are present at the input to the carrier detect circuit 325 in the FM burst mode optical transmitter 340. A photodiode 405 converts the optical signals back into electrical signals. Subsequently, a FM demodulator 410 demodulates the electrical signals. Reverse electronics 415 further condition the signal prior to further transmission to headend equipment.

Figure 5:
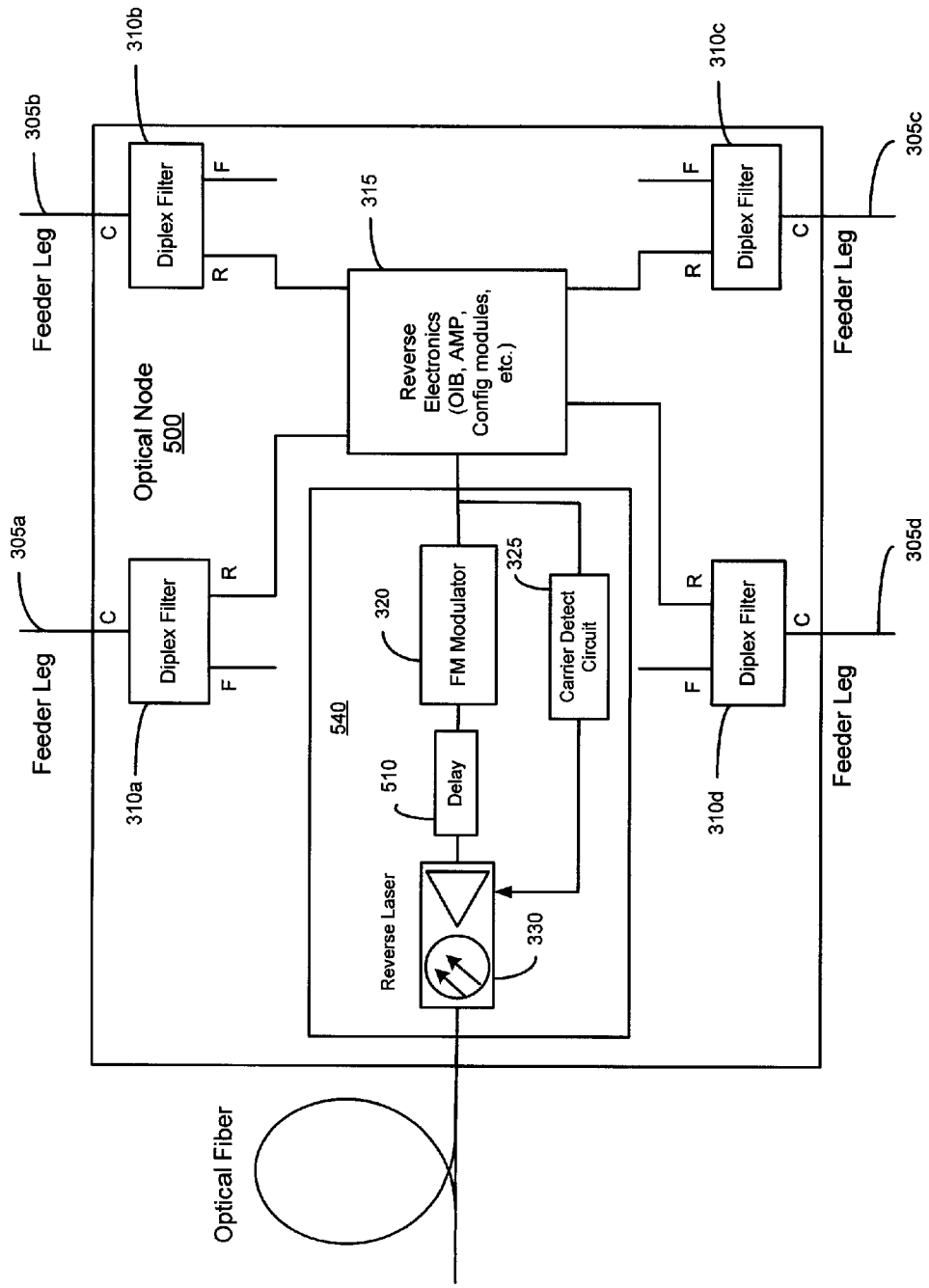
FIG. 5 is a block diagram of a second embodiment of a FM burst mode optical transmitter in accordance with the present invention.

FIG. 5 is a block diagram of an optical node 500 that includes an FM burst mode optical transmitter 540 in accordance with a further embodiment of the present invention. The FM burst mode optical transmitter 540 includes a delay circuit 510. The delay circuit 510 delays the frequency modulated electrical signals by an appropriate time in order to allow the carrier detect circuit 325 to detect the presence of a carrier signal and then turn on the laser 330. In this manner, reverse signals are not lost due to any time delays by the carrier detect circuit.

Figure 6:
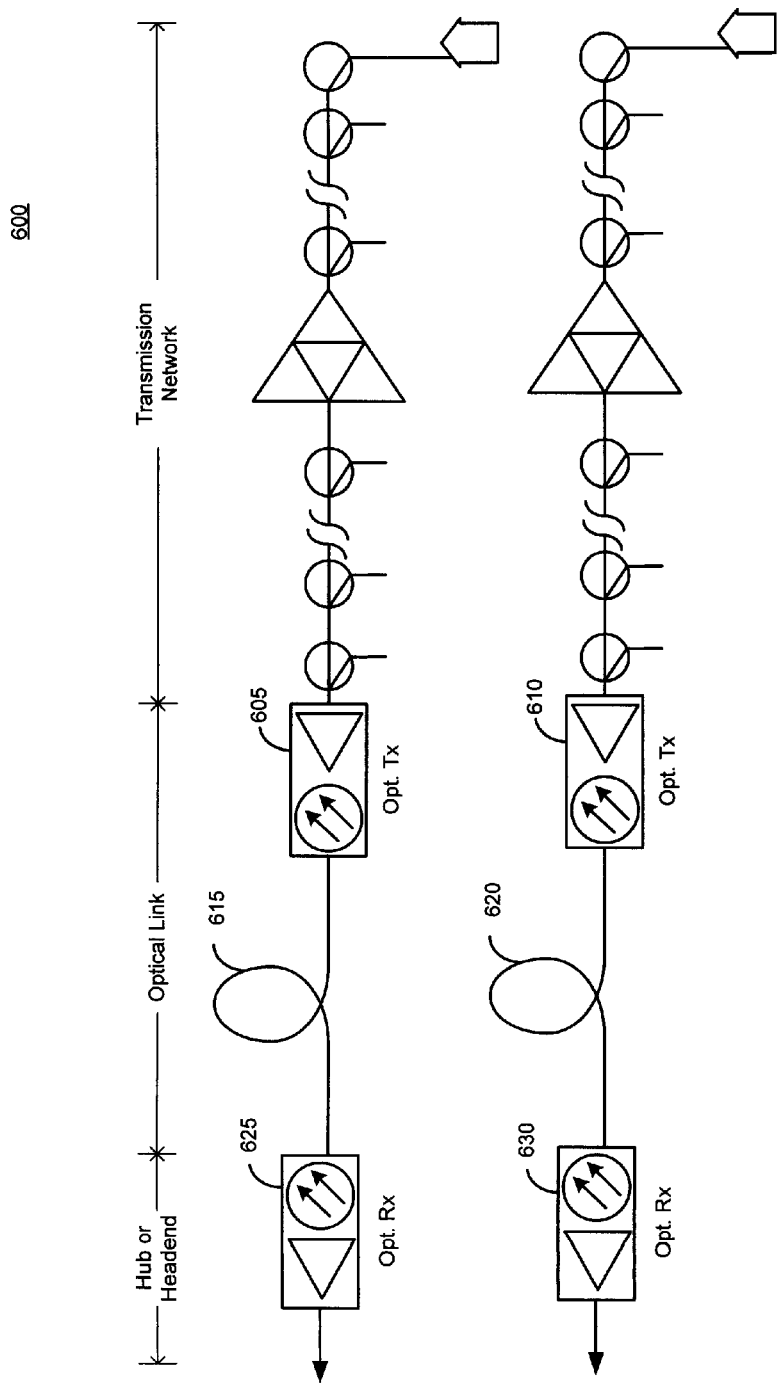
FIG. 6 is a block diagram of an optical system illustrating a one to one correlation of an optical transmitter to an optical receiver.

FIG. 6 is a block diagram of a prior art optical system 600 illustrating a one-to-one correlation of an optical transmitter to an optical receiver. As mentioned previously, because conventional optical transmitters 605, 610 transmit reverse signals at all times, a single optical fiber 615, 620 is coupled to a single optical receiver 625, 630 so that signals are not lost or corrupted by other optical signals along the optical fiber. In some applications, optical signals from a plurality of optical transmitters can be combined on a single optical fiber. Specifically, a wave division multiplexer (not shown) at the output of the plurality of optical transmitters multiplexes each optical signal at a different wavelength (i.e., not a common, or single, wavelength such as the present invention). The combined wavelengths are then transmitted on a single fiber and then received at a wave division demultiplexer. Subsequently, the demultiplexer separates the signals and returns each of them back to their original wavelength. An optical receiver then receives each of the optical signals. Again, however, there is a requirement for the one-to-one correlation between the optical transmitter and receiver.

Figure 7:
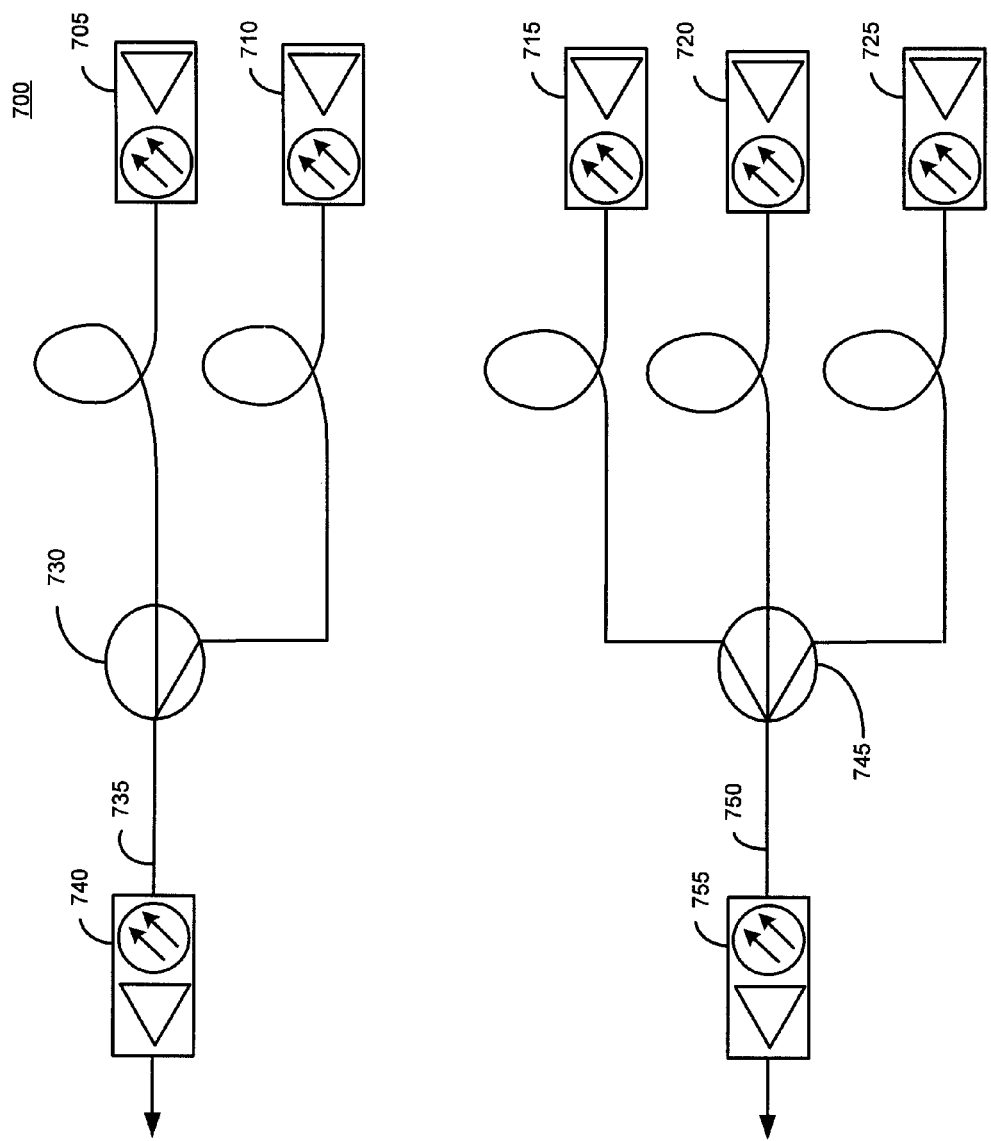
FIG. 7 is a block diagram of an optical system in accordance with the present invention illustrating a plurality of optical transmitters that transmit to a common, or single, optical receiver.

FIG. 7 is a block diagram of an FM burst mode optical system in accordance with the present invention illustrating a plurality of FM burst mode optical transmitters that transmit to a common, or single, reverse FM optical receiver. More specifically, FM burst mode optical system 700 illustrates, by way of example, optical transmitters 705, 710, 715, 720, 725 that each include a carrier detect circuit 325 (FIG. 3) and a FM modulator 320 (FIG. 3). Accordingly, each FM burst mode optical transmitter 705-725 transmits optical signals only when a subcarrier signal is present. Since optical signals are transmitted only when subcarrier signals are present, the likelihood of signal collisions is low as compared to systems using conventional optical transmitters that continuously transmit reverse optical signals. A passive combiner 730 combines the optical signals from the FM burst mode optical transmitters 705, 710 and transmits the combined optical signals on a single fiber 735. Advantageously, expensive wave division multiplexers and demultiplexers are no longer required. A single FM optical receiver 740 receives the combined optical signals and processes them as explained hereinabove in reference to FIG. 4.

The optical system 700 can variously arranged in accordance with the number of active subscribers 150. For example, signals from the FM burst mode optical transmitters 715, 720, 725 may be passively combined by combiner 745 and transmitted on a single optical fiber 750. FM optical receiver 755 may then receive the combined signals from three optical transmitters as opposed to the FM optical receiver 740, which receives the combined signals from the two FM burst mode optical transmitters 705, 710. Additionally, the FM burst mode optical receivers 740, 755 may be included in a single hub in the system or in different hubs depending upon the application.

Accordingly, systems and methods have been described that enable a frequency modulated burst mode optical system. It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and protected by the following claims.

The invention claimed is:

1. A method for transmitting optical signals from a plurality of frequency modulated burst mode optical transmitters, the method comprising the steps of:

at each of the plurality of frequency modulated optical transmitters, receiving via feeder legs frequency modulated reverse electrical signals electrically transmitted from subscribers in an upstream direction;

checking for the presence of a subcarrier signal within the frequency modulated reverse electrical signals via a carrier detect circuit;

frequency modulating a carrier signal with the frequency modulated reverse electrical signals via a frequency modulation modulator;

in the presence of detecting a subcarrier signal by the carrier detect circuit, intensity modulating a laser with the frequency modulated carrier signal to provide an optical signal;

in the absence of detecting the presence of a subcarrier signal by the carrier detect circuit, preventing the transmission of an optical signal from the laser:

transmitting the optical signals on an optical fiber; at a passive combiner, combining the optical signals from each of the frequency modulated optical transmitters; and
transmitting the combined optical signals on a single fiber, where each of the optical signals has a common wavelength.

2. The method of claim 1, further comprising the step of receiving the combined optical signals at a single frequency modulated optical receiver.

3. The method of claim 2, further comprising the steps of:
at the frequency modulated optical receiver,
converting the combined optical signals into a combined frequency modulated electrical signal; and
demodulating the combined frequency modulated electrical signal.

4. The method of claim 1, further comprising the step of controlling the laser via the carrier detect circuit.

5. The method of claim 1, further comprising the step of controlling the frequency modulation modulator via the carrier detect circuit.

6. The method of claim 1, wherein the carrier signal that is frequency modulated with the frequency modulated reverse electrical signals is a predetermined GHz signal.

7. A system for transmitting burst mode optical signals comprising:
a plurality of frequency modulated burst mode optical transmitters, wherein each frequency modulated burst mode optical transmitter comprises:
reverse electronics configured to receive frequency modulated reverse electrical signals provided from subscribers in an upstream direction,
a carrier detect circuit for detecting a subcarrier signal transmitted within frequency modulated reverse electrical signals,
a frequency modulation modulator for frequency modulating a carrier signal having a predetermined GHz frequency with the frequency modulated reverse electrical signals, and
a laser for generating an optical signal, the optical signal intensity modulated by the frequency modulated carrier signal and transmitted only when a subcarrier signal is detected within the frequency modulated reverse electrical signals;
a passive combiner for receiving the optical signals from each of the plurality of frequency modulated optical transmitters and combining them to form a combined optical signal; and
a single optical fiber for transmitting the combined optical signal.

8. The system of claim 7, wherein the combined optical signals transmitted on the single fiber have a common wavelength.

9. The system of claim 7, further comprising:
a frequency modulated optical receiver for receiving the combined optical signals, wherein the combined optical signals have a common wavelength.

10. The system of claim 9, wherein the frequency modulated optical receiver comprises:

a photodiode for converting the combined optical signals into frequency modulated electrical signals; and
a frequency modulation demodulator for demodulating the frequency modulated electrical signals.

11. The system of claim 7, wherein the laser is controlled by the carrier detect circuit.

12. The system of claim 7, wherein the frequency modulation modulator is controlled by the carrier detect circuit.

13. A system for transmitting and receiving frequency modulated burst mode optical signals, the system comprising:
a plurality of hubs, each hub comprising at least one frequency modulated optical receiver for receiving a combined optical signal, the at least one frequency modulated optical receiver comprising:
a photodiode for converting the combined optical signal into a frequency modulated electrical signal, and
a frequency modulation demodulator for demodulating the frequency modulated electrical signal;
a plurality of frequency modulated optical transmitters coupled to one of the plurality of hubs, each frequency modulated optical transmitter comprising:
a carrier detect circuit for detecting a subcarrier signal transmitted within frequency modulated reverse electrical signals transmitted by subscribers in an upstream direction,
a frequency modulation modulator for frequency modulating a carrier signal with the frequency modulated reverse electrical signals to provide a frequency modulated carrier signal, and
a laser for transmitting an optical signal, the laser intensity modulated with the frequency modulated carrier signal and adapted to transmit an optical signal only when a subcarrier signal is detected; and
an optical combiner coupled between the plurality of frequency modulated optical transmitters and one of the plurality of hubs, the optical combiner for receiving the optical signals from each of the plurality of frequency modulated transmitters and passively combining the optical signals for transmission on a single fiber,
wherein the combined optical signals have a common wavelength, and a predetermined GHz signal is frequency modulated with the frequency modulated reverse electrical signals.

14. The system of claim 13, wherein the laser is controlled by the carrier detect circuit.

15. The system of claim 13, wherein the frequency modulation modulator frequency modulates a carrier signal with the frequency modulated reverse electrical signals only when a subcarrier signal is detected.

16. The system of claim 13, wherein the frequency modulation modulator is controlled by the carrier detect circuit.

17. The system of claim 13, wherein the frequency modulated reverse electrical signals are transmitted in a predetermined reverse subcarrier frequency range.

* * * * *